May 14, 1957     S. B. TUWINER     2,792,342
ELECTROWINNING OF COPPER
Filed Jan. 26, 1956     2 Sheets-Sheet 1
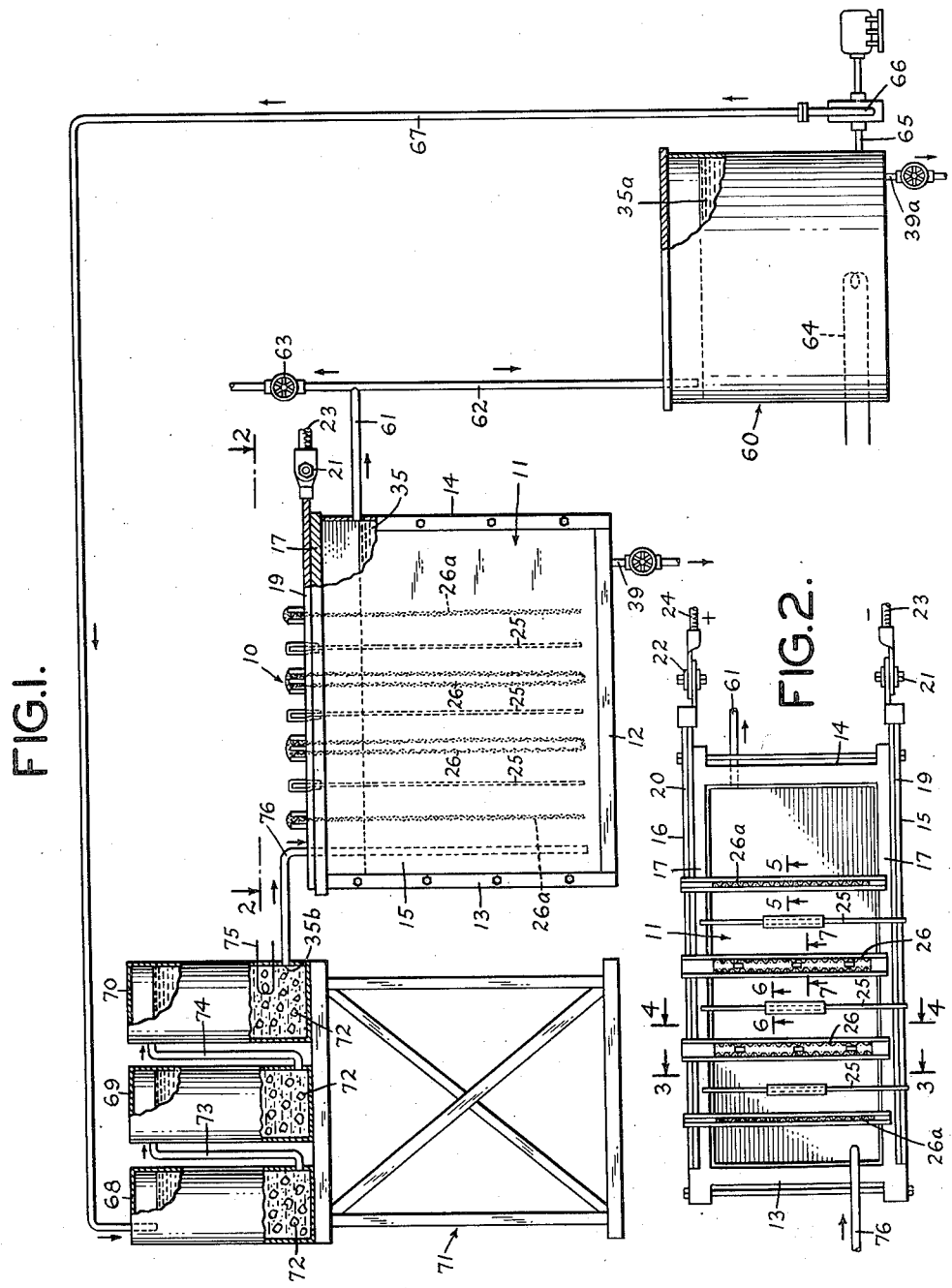

May 14, 1957 S. B. TUWINER 2,792,342
ELECTROWINNING OF COPPER

Filed Jan. 26, 1956 2 Sheets-Sheet 2

United States Patent Office 2,792,342
Patented May 14, 1957

2,792,342

ELECTROWINNING OF COPPER

Sidney B. Tuwiner, Baldwin, N. Y., assignor to Phelps Dodge Corporation, New York, N. Y., a corporation of New York Application January 26, 1956, Serial No. 561,407

14 Claims. (Cl. 204—108)

This invention relates to electrowinning of copper.

To recover refined copper from precipitated or cement copper, shotted blister copper, copper-rich alloys, copper-rich matte or from ores or concentrates containing chalcocite, it is advantageous to have a process which comprises the leaching of such materials with an acid sulfate solution followed by the electrowinning of the copper as cathodes. Two methods of leaching such copper-containing materials with acid sulfate solutions are known. In one of these methods the copper and acid are brought in contact with air, the oxygen of which converts the metallic copper and sulfuric acid into dissolved copper sulfate. In the other method a dissolved oxidizing agent—commonly, ferric sulfate—is employed to convert the metallic copper into the sulfate. The reactions which occur in these two operations are represented respectively by the following equations:

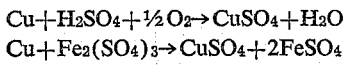

$$Cu + H_2SO_4 + \tfrac{1}{2}O_2 \rightarrow CuSO_4 + H_2O$$
$$Cu + Fe_2(SO_4)_3 \rightarrow CuSO_4 + 2FeSO_4$$

In the electrowinning of copper these reactions are caused to be reversed by the expenditure of electrical energy. In the first mentioned process the electrolysis comprises the deposition of refined metallic copper at the cathode while generating oxygen at the anode. This serves to regenerate the solution by removal of the copper and restoring an equivalent quantity of sulfuric acid for further leaching. In the second mentioned process copper is deposited at the cathode as in the first process but the anode reaction reoxidizes the ferrous sulfate back to ferric sulfate, thereby regenerating the composition to that prevailing prior to leaching.

In either of these two processes the solution may be recycled indefinitely but for the accumulation of impurities, or but for side reactions which may occur and which may alter the composition of the solutions from that which is most desirable for the process.

A principle object of my invention is the recovery at minimum expenditure of electrical energy of copper of high purity in compact physical form from scrap materials containing metallic copper, from copper-rich alloys, from shotted blister copper, from copper-rich matte, chalcocite, or from ores, concentrates, or other similar materials, containing copper. I achieve this by means of a cyclic process in which ferric sulfate, the leaching reagent, is regenerated to ferrous sulfate at the anode with a current efficiency equal to that of the cathode copper deposition.

I have discovered that by a combination of electrolyte composition, temperature, anode material and structure, and current density, I can so conduct the process of electrolytic deposition and regeneration that the cell voltage remains below the minimum for the generation at the anodes of oxygen and sulphuric acid. Also, in the practice of my process the expenditure of electrical energy for the copper electrowinning may be reduced to less than one-half that which has heretofore been required in commercial practice and more than twice the production rate of cathode copper per unit of cell volume may be obtained.

Known commercial processes for copper electrowinning are operated at relatively low current densities of 10 or 12 amps./sq. ft. of cathode area at low cathode current efficiencies of 70 or 75%, and at high cell voltages of two volts or more. Materials heretofore used for anode construction include antimonial lead, complex cast copper alloys such as "Chilex" and high silicon cast irons. Each of these materials resists corrosion by the formation of a protective film at the surface of the anodes during operation. The electrical resistance of this film is responsible for the relatively high cell voltage obtained when using anodes composed of these materials.

I have discovered that a corrosion resistant metal, such as austenitic stainless steel, may be used for the construction of insoluble anodes in the electrowinning of copper and better results are obtained provided that the wetted surface area of the anodes within its peripheral dimensions be extended, preferably by the use of a grid so that the area of the surface exposed to the electrolyte solution is substantially greater than the area of a planar surface having the same peripheral dimensions. Preferably the effective wetted area of each anode should be at least two times the area of a planar surface enclosed by a corresponding periphery. That is, the anode may be in the form of a grid, preferably a foraminous grid, and preferably the effective wetted area of the anode when submerged should be more than two times what the effective wetted area would be if the anode were not in the form of a grid but had flat planar surfaces and the same peripheral dimensions. The electrolyte, in addition to the usual components, such as copper sulfate, and sulfates of other metals in the material being leached, should contain at least 20 gms./l. of total iron as ferric and ferrous sulfate.

The electrolyte temperature in the electrowinning cells should exceed 110° F. and should be preferably within the range of 135–165° F. The circulation of electrolyte should be such as to maintain a concentration of iron as ferric at less than 25 gms. per liter in the solution leaving the electrowinning tank. Preferably, the concentration of iron, as ferric sulfate, in the electrolyte entering the electrowinning tank should be no greater than 10 gms./l. Cell voltage should be from 0.85 to 1.2 volts. This will suffice to generate the required minimum of current while avoiding the liberation of oxygen at the anodes and the corrosion of them. Cathode current density may be in the range of 10 to 25 amps./sq. ft. but preferably should be in the range of 15 to 20 amps./sq. ft.

I prefer to operate the cells in electrowinning tanks similar to those used in standard multiple system copper refining. As anodes I prefer to use an assembly made of two closely spaced layers of stainless steel screen held by, or fastened to, one or more copper bars which support the screens mechanically and join them electrically. A suitable screen material is mesh screen made from 0.081 inch diameter austenitic stainless steel wire, woven to have six square openings per linear inch, viz, thirty-six per square inch.

As one example illustrating the method of my invention, five cathodes consisting of copper starting sheets 16 inches wide and 16 inches immersed depth were hung in a rectangular stainless steel tank having a capacity of 35 gallons with a spacing of 4 inches. Between each two of the cathodes were hung anodes consisting of two layers of 6 mesh, Type 316 austenitic stainless steel wire mesh. Both anodes and cathodes were joined to supporting copper bars which rested upon triangular bus bars, the anodes resting on a bus bar at one side, the cathodes resting on a bus bar on the other. The bus bars were connected electrically with a generator which furnished a current of 275 amperes. Liquor was circulated at the rate of ½ gal.

per min., entering at the top of the electrolytic tank and leaving through an opening at the bottom into a heating tank of 4½ gal. capacity, containing a 1000 watt electric immersion heater. From this heating tank the liquor was withdrawn by means of a centrifugal pump which discharged into another tank, designated as a dissolving tank, of 20 gallon capacity which was filled with shotted blister copper. The liquor percolated upward through the bed of copper shot, overflowing to feed the electrolytic tank, thus completing the circuit. The circulating liquor leaving the heating tank was maintained at a temperature of 150° F. The circulating liquor entering the electrolytic tank analyzed as follows:

| | Gms./l. |
|---|---|
| Cu | 27.78 |
| Free acid | 210.0 |
| Ferric | 4.26 |

The liquor leaving the electrolytic tank analyzed as follows:

| | Gms./l. |
|---|---|
| Cu | 24.23 |
| Free acid | 208.6 |
| Total iron | 36.18 |
| Ferric | 10.24 |
| Ni | 8.6 |
| As | 0.336 |
| Sb | 1.685 |
| Cl | 0.0086 |

The cathodes were left under current for ten days after which time the copper deposited on them was 115.3 lbs. The average current density for the ten-day period was 15.3 amps. per square foot. Average current efficiency was 96.9% and average cell voltage was 0.99 volt. Throughout the run shotted copper was added to the dissolving tank each day to replenish that which was dissolved in the liquor and deposited from the liquor upon the cathodes. After the ten-day period the contents of the dissolving tank were removed and slimes containing the precious metal values as well as impurities of the shotted copper were separated and recovered.

Although the novel features which are believed to be characteristic of the invention are pointed out in the annexed claims, the invention itself as to its objects and advantages and the manner in which it may be carried out may be better understood by reference to the following more detailed description taken in connection with the accompanying drawings, showing one form of apparatus for carrying out the invention, in which Fig. 1 is a view in elevation, partly in section and primarily diagrammatic, illustrating apparatus suitable for practicing my process;

Fig. 2 is a plan view of the electrolytic tank on line 2—2 of Fig. 1;

Figure 3:
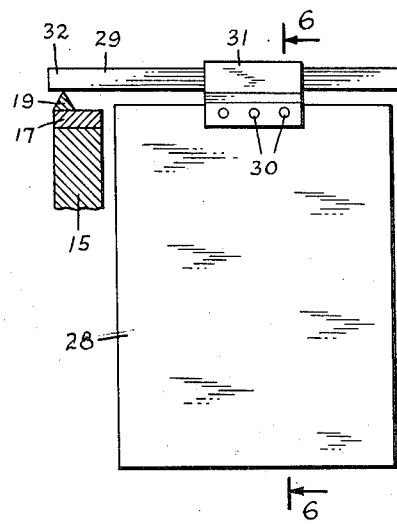
Fig. 3 is a view in elevation on line 3—3 of Fig. 2 illustrating a typical cathode.
Figure 4:
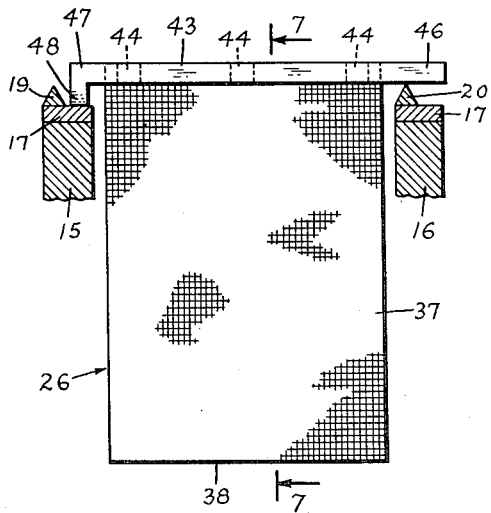
Fig. 4 is a view in elevation on line 4—4 of Fig. 2 illustrating a typical anode used between cathodes in the electrowinning cell.
Figure 6:
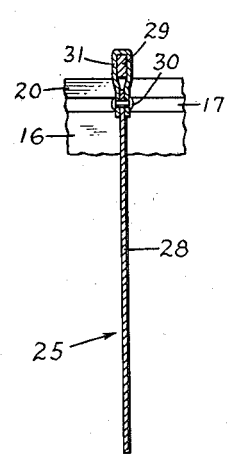
Figure 7:
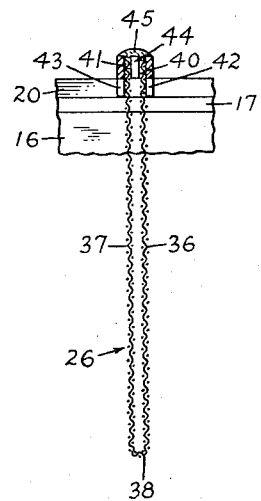

Fig. 6 is a view in section of a cathode taken on line 6—6 of Figs. 2 and 3; and Fig. 7 is a view in section of the anode shown in Fig. 4, taken on line 7—7 of Figs. 2 and 4.

Referring now to the drawings, in which like reference characters indicate similar parts throughout the views, 10 indicates a battery of electrolytic cells, comprising anodes and cathodes suspended in an electrolyte solution in a lead lined tank 11 having bottom wall 12, end walls 13, 14 and side walls 15, 16. On the top edges of these walls is a wood frame 17 for supporting triangular contact or bus bars 19, 20, to which are secured by electrical connections 21, 22 the electrical wires 23, 24, which, in turn, are connected to a suitable source (not shown) of direct current power.

Cathodes 25 and anodes 26 and 26a are suspended in the electrolyte liquor 35 in the tank 11, each electrolytic cell being considered as an anode and a cathode spaced therefrom with an electrolyte between the adjacent faces. A typical cathode 25 (see Figs. 3 and 6) comprises a copper sheet 28 (sometimes called a "starting" sheet) which is secured to a supporting copper bar 29 by a copper sheet loop 31, riveted as shown at 30, the looped portion 31 being joined to the copper supporting bar in a way to provide good electrical contact. When suspended in the tank the area below the loop is submerged in the electrolyte 35 and the copper supporting bar at its end 32 rests upon copper bus bar 19 and the other end 33 of the supporting bar is provided with a block portion 34 which rests upon the wooden support 17, without making electrical contact with bus bar 20. In the tank 11, as shown, there are three cathodes 25, one between each adjacent pair of cathodes 26 and 26a (see Figs. 1 and 2). It will be understood that a different number of anodes and cathodes may be employed, depending on the size of the installation, it being noted that the cathodes are placed between anodes and, as will be mentioned later on, the end anodes 26a have an area exposed to the electrolyte when submerged which is half the area of anodes 26 exposed to the electrolyte because the anodes 26a are single-ply wire mesh whereas the anodes 26 are two-ply. That is, the wetted surface of each end anode 26a is half the wetted surface of each intermediate anode 26.

A typical intermediate anode 26 comprises a suitable length of stainless steel wire mesh screen doubled on itself providing two plies 36, 37, thus providing an anode which comprises a leg 36 and a leg 37 joined by curved portion 38. The outer end portions 40, 41 are mounted between a pair of anode supporting bars 42, 43 made of copper and held in spaced relation by filler blocks 44. The upper end portions of the wire mesh are fastened to the copper bars 42, 43 in any suitable manner to provide good electrical contact. As shown, the bars are joined to the wire mesh and to each other by brazing 45. One end 46 of the anode supporting bar rests upon bus bar 20 and the other end 47 is provided with a block portion 48 which rests upon the wood frame 17 when the anode is suspended in the tank 11.

Figure 5:
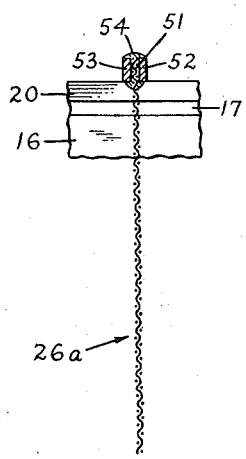
Fig. 5 is a view in section taken on line 5—5 of Fig. 2 illustrating a typical end anode.

The end anodes 26a are constructed of wire mesh like that of anodes 26 but differ in construction in that anodes 26a are single-ply, as shown in Fig. 5. The wire mesh, of suitable size, to correspond to the size of anodes 26, is clamped at its upper end 51 between two copper bars 52, 53, which are similar to bars 42, 43 in shape, and fastened to the bars in any suitable manner to provide good electrical contact, as by brazing 54. The ends of the supporting bars 52, 53 are supported as the ends 46 and 47 are supported, when the anode is suspended in the tank 11.

In the apparatus illustrated, the wetted surface of each of the end anodes 26a is approximately 2.5 times the area of one side face of the anode 26a calculated as though this face were a planar surface within the same peripheral dimensions. This increased effective wetted area as compared to a plane surface is, of course, accounted for by the cylindrical shape of the wire of the wire mesh. The wetted surface of each intermediate anode 26, having two plies 36, 37 of wire mesh, is approximately 2.5 times the area of two side faces of the anode 26 calculated as though the faces were planar surfaces within the same peripheral dimensions. Also, as illustrated, the effective wetted area of each end anode 26a is approximately 2.5 times the wetted area of one side face of the cathodes 25 adjacent the end anodes and the effective wetted area of each of the two-ply anodes 26 is approximately 2.5 times the wetted area of two side faces of cathodes 25. Thus the effective wetted surface of one leg of a two ply anode 26a is approximately 2.5 times the area of the effective wetted surface of one side or planar face of a cathode 25 adjacent one side of the anode and the wetted surface of the other leg of the two ply anode is approximately 2.5 times the area of the effective wetted surface of the side or planar face of the cathode adjacent the other side of that anode.

A sump tank 60, located preferably below the level of tank 11, receives the electrolyte solution 35, after it has copper removed therefrom and has been regenerated in the electrolytic cells 10 by converting a corresponding amount of ferrous sulfate to ferric sulfate. The regenerated liquor passes from the end of tank 11 at the surface of the liquor through a pipe 61, 62 provided with a vent valve 63, into tank 60. The tank 60 is provided with a suitable heating means 64 (shown conventionally) for heating the regenerated, copper impoverished liquor 35a. A pipe 65 leads from the tank 60, near its bottom into the intake side of a driven pump 66 which discharges into pipe 67 leading into a dissolving tank, in which the raw material 72, containing copper to be recovered as refined copper, is charged. Slimes may be drawn from tanks 11 and 60, from time to time as desired, through drain pipes 39 and 39a each having an openable and closeable valve.

As shown, the dissolving tank comprises three tanks 68, 69, and 70 in series, but a single tank of suitable size may be employed. The dissolving tanks are mounted above the electrolytic tank 11 on a supporting structure 71. The regenerated liquor 35a enters the dissolving tank 68 at its upper end and percolates downwardly through the charge 72 of raw material, such, for example, as copper scrap, thence upwardly through pipe 73, downwardly through tank 69, thence upwardly through pipe 74, thence downwardly through tank 70. The dissolving tank may, if desired, be equipped with heating means, 75 (shown conventionally).

The electrolyte liquor passing through the dissolving tanks dissolves the metallic constituents of the charge 72, and inasmuch as a solution of ferric sulfate is employed as the leaching or dissolving agent, the copper in the charge is converted to copper sulfate and the ferric sulfate is converted to ferrous sulfate, thus restoring the electrolyte solution so that it is enriched in copper sulfate with a corresponding conversion of ferric to ferrous sulfate.

The electrolyte now enriched with copper sulfate with corresponding impoverishment in ferric sulfate, and designated 35b, passes from the dissolving tank 70, through pipe 76 into the bottom of electrolytic tank 11, at the head end opposite to the tail end where discharge pipe 61 is connected. Thus, the electrolyte liquor passes upwardly as it passes through the electrolytic tank.

As another example to illustrate the method of the invention, an electrolytic tank 36" x 48" x 48", of lead lined wood construction, like tank 11 illustrated in the drawings was equipped with four anodes 26, 26a. These were made of 6 mesh, 0.081" wire cloth made of Type 316 stainless steel.

The anodes were made of wire mesh 36" wide and had a submersion depth of 38". The end anodes 26a were single-ply as illustrated in Fig. 5 and the effective wetted surface was calculated to be 3420 square inches. The intermediate anodes were two-ply sandwiched between two ¼" by 1" copper flat stock bars, brazed for electrical contact, as illustrated in Figs. 4 and 7. The effective wetted surface was calculated to be 6840 square inches. The copper anode supporting bars which carried the anode current rested, one one side of the tank, on the edge of the triangular bus bar 20 while the other end rested on the wood frame 17.

The anode assemblies 26, 26a were spaced 4½" apart and between each pair there was placed a cathode starting sheet 25 suspended from the supporting copper bar 29 by means of a single loop of starting sheet material as illustrated in Fig. 6. The cathode was a standard 37½" x 37½" starting sheet, submerged depth of 37", and the cathode bars rested on the bus bar 19 at one end and on the wooden frame 17 at the other as illustrated in Fig. 3.

Regenerated electrolyte 35a, now enriched with ferric sulfate with corresponding impoverishment in copper sulfate, which may also conveniently be referred to as "spent" electrolyte, flowed continuously by gravity from the electrolytic tank 11 into lead lined sump tank 60, as illustrated in Fig. 1, where it was heated by means of a steam coil 64. It was then continuously pumped from tank 60 by a stainless steel pump, to a set of three thirty gallon stainless steel leaching tanks 68, 69, 70, in series as illustrated in Fig. 1, in which a charge of scrap copper to be refined was maintained. Flow of solution was downward in each tank, the flow being by gravity from the first to the second tank, from the second to the third and from the third tank to the bottom of electrolytic tank 11 through pipe 76. The restored electrolytic solution 35b flowed continuously into tank 11. The electrolyte then flowed from head end 13 to tail end 14 and upwardly in tank 11 to the overflow outlet pipe 61. A floating cover or film of molten paraffin wax maintained on the surface of the electrolyte solution 35 in the electrolytic tank and also on the surface of the liquor 35a in sump tank 60 to reduce evaporation and heat loss. The material 72 leached in the tanks 68, 69, 70 was a mixture of No. 1 and No. 2 copper wire scrap and automobile radiator scrap.

The electrolyte liquor was continuously circulated through the system in a run for a period of 453 hours.

Data and results for this run are as follows:

Time of deposition (length of run). 453 hrs.
Ave. amperes_____ 920.38 amps.
Ave. volts_____ 0.97 v.
Cathode current density___ 15.71 amps./sq. ft.
Anode cur. dens. (based on wetted area). 6.52 amps./sq. ft.
Total ampere hours_____ 416,930 amp. hrs.
Theoretical copper deposit__ 1089.92 lbs.
Actual cathode copper produced__ 922.25 lbs.
Cathode current efficiency__ 84.6%.
Power required_____ 877.0 kwh./ton cathode copper.
Tank circulation_____ 1.30 gal./min.
Electrolyte temperature (entering electrolytic tank). 161° F.

ELECTROLYTE COMPOSITION

|  | Start of Run [1] | End of Run [1] |
| --- | --- | --- |
| Copper | 54.29 | 48.00 |
| Ferric iron | 15.10 | 21.70 |
| Total iron | 43.74 | 38.64 |
| Nickel | 0.36 | 0.47 |
| Zinc | 16.32 | 16.77 |
| Tin | 0.18 | 0.10 |
| Chromium | 0.12 | 0.13 |
| Arsenic | 0.01 | 0.01 |
| Antimony | 0.05 | 0.06 |
| Free Acid | 159.28 | 128.30 |
| Chlorine | 0.005 | 0.008 |
| Total Acid | 362.22 | 318.80 |
| Aluminum (Al₂O₃) | 1.29 | 1.15 |

[1] Composition of electrolyte leaving electrolytic tank—grams per liter.

As another example illustrating the method of my invention, the material charged to the leaching tanks, 68, 69 and 70, of the previous example was "black copper" in shotted form. This material had the following composition:

|  | Percent |
| --- | --- |
| Copper | 89.34 |
| Lead | 4.00 |
| Tin | 3.20 |
| Zinc | 2.75 |
| Arsenic | 0.06 |
| Antimony | 0.23 |
| Silicon | 0.24 |

The electrolyte, having a volume of 1069.8 liters and having been employed in the refining of similar materials, had accumulated impurities as shown in the following assays for the start of the run:

|  | G./l. |
|---|---|
| Copper | 35.21 |
| Ferric | 6.53 |
| Total iron | 31.01 |
| Nickel | 1.78 |
| Zinc | 47.04 |
| Tin | 2.13 |
| Arsenic | 0.05 |
| Antimony | 0.04 |
| Alumina | 2.16 |
| Total acid | 358.9 |
| Chlorine | 0.006 |

At the end of the run the corresponding assays were as follows for 1324 liters:

|  | G./l. |
|---|---|
| Copper | 41.39 |
| Ferric | 9.08 |
| Total iron | 29.90 |
| Nickel | 4.88 |
| Zinc | 41.61 |
| Arsenic | 0.03 |
| Antimony | 0.04 |
| Free acid | 129.3 |
| Alumina | 1.66 |
| Total acid | 329.05 |
| Chlorine | 0.001 |

During the period of running, which was 950 hours, there were produced 1233 lbs. of pure copper cathodes and 239 lbs. of slime residue from the leaching of the black copper which contained virtually all of the lead, tin, arsenic, antimony, and silicon which was contained in the black copper. This slime assayed as follows:

|  | Percent |
|---|---|
| Copper | 24.00 |
| Tin | 16.55 |
| Lead | 20.71 |
| Iron | 1.68 |
| Zinc | 1.63 |
| Sulfur | 11.42 |
| Arsenic | 0.32 |
| Antimony | 1.15 |
| Silica | 2.70 |

Throughout the run the rate of reduction of ferric in the leach tanks had to be equal to the rate of its generation in the electrolysis. The former was equivalent to the copper leached plus impurities: the latter was equivalent to the deposition of copper alone. Consequently the copper dissolved morely slowly than it was deposited and the difference had to be furnished from an external source to avoid depletion of the solution with regard to copper in the electrlytic tank 11.

This was accomplished by a periodic withdrawal of electrolyte from the cycle and reacting the acid contained therein with a by-product copper scale consisting of a mixture of metallic copper with cuprous and cupric oxides. The reaction was conducted at 190° F. and air was admitted in order to promote the corrosion of the metallic copper and complete the dissolution of the cuprous oxide. During the run a total of 229.15 lbs. of copper were added to the system in this way.

After reaction of the acid with the copper and oxides each batch was evaporated and cooled to produce crystals of copper sulfate pentahydrate. The mother liquor contained the zinc and other impurities in concentrated form for withdrawal from the system. The copper sulfate crystals were returned to the main stream of electrolyte. In this way the level of electrolyte impurities, particularly of zinc, was maintained.

In this process of maintaining the proper concentration of copper sulfate in the electrolytic tank 11, the total volume of mother liquor discarded from the system was 72.5 liters and its assay was as follows:

|  | G./l |
|---|---|
| Copper | 37.81 |
| Iron | 37.31 |
| Zinc | 71.42 |
| Sulfate | 274.23 |

In order to maintain the desired acid concentration in the solution, sulfuric acid had to be added periodically to it, in total amount of 348 pounds.

The average electrolyte temperature for this run, covering a period of 950 hours, was 157° F. The current density averaged 13.03 amps. per sq. ft. of cathode surface, the cell voltage was 0.98 volt, and the rate of circulation of the electrolyte solution was one gallon per minute.

It will be seen from the foregoing description that in my process the copper is electrolytically deposited from solution at substantially higher than normal cathode current density which has been common in prior art commercial copper electrowinning practice but the cell voltage is materially lower than in prior art commercial practice. Whereas in prior practice normal cell voltage has been about 2.3 volts in copper electrowinning, the cell voltage in my process should not exceed about 1.2 volts and preferably should be less than one volt but not less than about 0.85 volt. In my process the liberation of oxygen at the anodes either directly as a gas or indirectly by forming an oxidized layer on the anode surface, is done away with or eliminated. This is accomplished by the use of sufficient ferrous sulfate in the electrolyte to allow the oxidation of ferric sulfate to occur at the anode without undesirable liberation of oxygen; by the choice of a type of metal for the anode which will not easily develop an oxidized current resistant film; and by making the area of the surface of the anode two to three times the surface area of the cathode (by means of a wire mesh or similar structure) so that the density of current is sufficiently low at the anode to further inhibit the oxidizing and oxygen liberating reactions from taking place.

The terms and expressions which have been employed herein are used as terms of description and not of limitation, and there is no intention in the use of such terms and expressions of excluding any equivalent of the features shown and described or portions thereof, but it is recognized that various modifications are possible within the scope of the invention claimed.

What is claimed is:

1. A system for electrowinning of copper which comprises, an electrolytic tank through which electrolyte solution containing acid, copper sulfate and ferrous sulfate, may be circulated, a plurality of anodes made of austenitic stainless steel and a plurality of cathodes made of copper, said anodes and cathodes being suspended in said tank so that they are wetted by the electrolyte solution when the electrolyte solution is circulated through said tank, said anodes and cathodes providing a battery of electric cells in said tank when the electrolyte solution is circulated therethrough, each cell comprising a wetted anode face and a wetted cathode face having electrolyte solution therebetween, each anode and cathode having surfaces so that the area of the effective wetted surface of each anode face is at least two times the area of the effective wetted surface of its adjacent cathode face, a source of direct current connected to said cells and adapted to maintain a potential of greater than 0.85 volt but less than 1.2 volts per cell, means external to said tank for restoring spent electrolyte solution discharged from said tank and means for returning the restored electrolyte solution to said tank.

2. A system for electrowinning of copper which comprises, an electrolytic tank through which an electrolyte solution containing acid, copper sulfate and ferrous sulfate, may be circulated, a plurality of anodes made of austenitic stainless steel in the form of a foraminous grid and a plurality of cathodes made of copper, said anodes and cathodes being suspended in said tank so that they are partially submerged in the electrolyte solution in said tank when said electrolyte solution is passed therethrough, said anodes and cathodes providing a battery of electric cells in said tank, each cell comprising a wetted anode face and a wetted cathode face having electrolyte solution therebetween, each anode and cathode having surfaces so that the area of the effective wetted surface of each anode face is at least two times the area of the effective wetted surface of its adjacent cathode face, a source of direct current connected to said cells and adapted to provide a potential of greater than 0.85 volt but less than 1.2 volts per cell, means external to said tank for restoring spent electrolyte solution discharged from said tank and means for returning the restored electrolyte solution to said tank.

3. A system for electrowinning of copper through which may be circulated continuously an electrolyte solution containing acid, copper sulfate, ferric sulfate, and ferrous sulfate, which comprises an electrolytic tank through which such electrolyte solution is circulate, a plurality of anodes in the form of an austenitic stainless steel wire mesh and a plurality of cathodes made of copper, said anodes and cathodes being mounted in said tank so that they are suspended in the electrolyte solution when the solution is passed through said tank, said anodes and cathodes providing a battery of electric cells in said tank, each cell comprising a wetted anode face and a wetted cathode face having electrolyte solution therebetween, each anode and cathode having surfaces so that the area of the effective wetted surface of each anode face is at least two times the area of the effective wetted surface of its adjacent cathode face, a source of direct current connected to said cells and adapted to maintain a potential of greater than 0.85 volt but less than 1.2 volts per cell, whereby copper is deposited from the electrolyte solution on to said cathodes as it passes through said tank, thereby impoverishing said solution in copper sulfate and enriching it in ferric sulfate and forming a regenerated solution, means external to said tank for restoring said electrolyte so that it is enriched in copper sulfate and impoverished in ferric sulfate, and means for returning said restored solution to said tank.

4. A method of electrowinning of copper which comprises circulating an electrolyte solution containing acid, copper salt and ferrous salt, through a plurality of electrolytic cells, each cell comprising an anode made of stainless steel and having a non-planar anode face and a copper cathode having a substantially planar cathode face, the anode face having a wetted surface substantially greater than the area of its adjacent cathode face, maintaining a potential of greater than 0.85 volt per cell but less than that which generates oxygen on the anodes, restoring the spent solution therefrom and circulating said restored electrolyte solution through said cells.

5. A method of electrowinning of copper which comprises circulating an electrolyte solution containing acid, copper salt and ferrous salt, through a plurality of electrolytic cells, each cell comprising an anode made of stainless steel and having a non-planar anode face and a copper cathode having a substantially planar cathode face, the anode face having a wetted surface more than two times greater than the area of its adjacent cathode face, maintaining a potential of greater than 0.85 volt but less than 1.2 volts per cell, restoring the spent electrolyte solution therefrom, and circulating said restored electrolyte solution through said cells.

6. A method of electrowinning copper from a charge containing copper to be recovered which comprises passing an electrolyte solution containing acid, ferric sulfate and ferrous sulfate over and in intimate contact with said charge thereby converting copper in said charge to copper sulfate and reducing ferric sulfate in said solution to ferrous sulfate, passing the copper sulfate and ferrous sulfate enriched solution through an electrolytic cell wherein the anodes are in non-planar form and made of metal consisting essentially of stainless steel and having the corrosion resistant characteristics of stainless steel metal and submerged in said solution and the cathodes are made of copper and having substantially the same peripheral dimensions as said anodes and submerged in said solution, the area of the wetted surface of said anodes being at least two times the area of the wetted surface of said cathodes, electrodepositing copper on to said cathodes from said solution as it passes through said cell and thereby impoverishing said solution in copper sulfate and enriching said solution in ferric sulfate, passing the copper sulfate impoverished, ferric sulfate enriched solution over and in intimate contact with said charge thereby converting more copper to copper sulfate and reducing ferric sulfate in said solution to ferrous sulfate and repeating the cycle.

7. A method of electrowinning copper from a charge containing copper to be recovered which comprises passing an electrolyte solution containing ferric sulfate and ferrous sulfate over and in intimate contact with said charge thereby converting copper in said charge to copper sulfate and reducing ferric sulfate in said solution to ferrous sulfate and thereby producing an electrolyte solution enriched in copper sulfate and impoverished in ferric sulfate, passing the copper sulfate and ferrous sulfate enriched solution through an electrolytic cell wherein the anodes are in the form of a stainless steel foraminous grid and submerged in said solution and the cathodes are made of copper sheet material and submerged in said solution, the area of the wetted surfaces of said anodes being at least two times the area of the wetted surfaces of said cathodes, electrodepositing copper on to said cathodes from said solution as it passes through said cell and thereby impoverishing said solution in copper sulfate and enriching said solution in ferric sulfate and thereby regenerating said electrolyte solution, passing the regenerated, copper sulfate impoverished, ferric sulfate enriched solution over and in intimate contact with said charge thereby restoring said electrolyte solution by converting more copper to copper sulfate and reducing ferric sulfate in said solution to ferrous sulfate thereby producing more copper sulfate enriched, ferric sulfate impoverished solution and repeating the cycle as a continuous process.

8. A method of electrowinning copper from a charge containing copper to be recovered which comprises passing a stream of an electrolyte solution containing ferric sulfate and ferrous sulfate over and in intimate contact with said charge thereby converting copper in said charge to copper sulfate which dissolves in said stream and reducing ferric sulfate in said stream of solution to ferrous sulfate, passing the stream of copper sulfate and ferrous sulfate enriched solution through an electrolytic cell wherein the anodes are in the form of stainless steel foraminous grids having non-planar surfaces and submerged in said stream of solution and the cathodes are made of copper sheet material and submerged in said solution each cathode being placed adjacent to an anode, the area of the wetted surface of each of said anodes being at least two times the area of a planar surface having the same peripheral dimensions as the submerged part of said anode, electrodepositing copper on to said cathodes from said solution as said stream passes through said cell and thereby impoverishing said solution in copper sulfate and enriching said solution in ferric sulfate and thereby regenerating said stream of electrolyte, passing said stream of regenerated, copper sulfate impoverished, ferric sulfate enriched solution over and in intimate contact with said charge thereby converting more copper to copper sulfate which dissolves in said stream and reducing ferric sulfate in said solution to ferrous sulfate in said stream and circulating said stream over the charge and through said cell as a continuing cycle.

9. A method of electrowinning copper which comprises circulating electrolyte solution containing acid, copper sulfate, ferric and ferrous sulfates through an electrolytic tank in which is maintained a plurality of electrolytic cells each of which comprises an anode in the form of a stainless steel foraminous grid having an effective wetted surface area at least two times as great as the area of a planar surface having the same peripheral dimensions and a copper cathode having an effective wetted surface no greater than half the area of the effective wetted surface of said anode, maintaining a voltage of greater than 0.85 volt but less than 1.2 volts per cell, thereby depositing copper from said copper sulfate-containing solution on said cathodes with a corresponding conversion of ferrous sulfate to ferric sulfate in said solution in said tank and thereby forming a spent electrolyte solution, restoring said spent solution by dissolving more copper in said solution as copper sulfate with corresponding conversion of ferric sulfate to ferrous sulfate and passing said restored solution to said tank for further deposition of copper on said cathodes and repeating said cycle.

10. A method according to claim 9 in which a concentration of at least 20 grams per liter of iron as ferrous and ferric sulfates is maintained in said circulating electrolyte solution.

11. A method according to claim 10 in which the electrolyte solution in the electrolytic tank is maintained at a temperature above 100° F.

12. A method according to claim 11 in which the temperature of the electrolyte solution in the electrolytic tank is maintained between 135° F. and 165° F.

13. A method according to claim 12 in which the concentration of iron as ferric sulfate in the spent electrolyte solution as it leaves the electrolytic tank is maintained at less than 25 grams per liter.

14. A method according to claim 13 in which the cathode current density is maintained between 15 and 20 amperes per square foot but not so high as to cause the cell voltage to exceed 1.2 volts.

References Cited in the file of this patent

UNITED STATES PATENTS

| | | |
|---|---|---|
| 1,313,246 | Antisell | Aug. 19, 1919 |
| 1,920,820 | Rose et al. | Aug. 1, 1933 |
| 2,273,798 | Heise et al. | Feb. 17, 1942 |
| 2,579,551 | Corsini | Dec. 25, 1951 |
| 2,615,839 | Willier | Oct. 28, 1952 |